US010371208B2

(12) United States Patent
Bialke et al.

(10) Patent No.: US 10,371,208 B2
(45) Date of Patent: Aug. 6, 2019

(54) BEARING ASSEMBLIES WITH ELECTRODYNAMICALLY MATCHED RACES

(71) Applicant: Goodrich Corporation, Charlotte, NC (US)

(72) Inventors: William Edward Bialke, Trumansburg, NY (US); Eric Hansell, New Milford, CT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/668,663

(22) Filed: Aug. 3, 2017

(65) Prior Publication Data

US 2019/0040909 A1 Feb. 7, 2019

(51) Int. Cl.
| | |
|---|---|
| *F16C 33/58* | (2006.01) |
| *F16C 19/06* | (2006.01) |
| *F16C 19/26* | (2006.01) |
| *B23H 9/00* | (2006.01) |
| *B23H 1/00* | (2006.01) |
| *F16C 19/02* | (2006.01) |

(Continued)

(52) U.S. Cl.
CPC .............. *F16C 33/585* (2013.01); *B23H 1/00* (2013.01); *B23H 9/00* (2013.01); *F16C 19/02* (2013.01); *F16C 19/06* (2013.01); *F16C 19/22* (2013.01); *F16C 19/26* (2013.01); *F16C 33/64* (2013.01); *B23H 2200/10* (2013.01); *F16C 2220/68* (2013.01); *F16C 2361/55* (2013.01)

(58) Field of Classification Search
CPC ..... B23H 9/00; B23H 2200/10; F16C 33/585; F16C 19/06; F16C 2220/68; F16C 2361/55
See application file for complete search history.

(56) References Cited

U.S. PATENT DOCUMENTS

| | | |
|---|---|---|
| 2,782,160 A | 2/1957 | Treuhaft et al. |
| 3,547,796 A | 12/1970 | Randall |

(Continued)

FOREIGN PATENT DOCUMENTS

| | | |
|---|---|---|
| JP | 2003120692 A | 4/2003 |
| KR | 20140004951 A | 1/2014 |

(Continued)

OTHER PUBLICATIONS

Extended European Search Report, of the European Patent Office, dated Oct. 18, 2018, issued in corresponding European Patent Application No. 18186836.5.

*Primary Examiner* — Thomas R Hannon
(74) *Attorney, Agent, or Firm* — Locke Lord LLP; Daniel J. Fiorello; Joshua L. Jones

(57) ABSTRACT

A method of electro-dynamically matching a bearing assembly includes electrically separating inner and outer races from rolling elements of the bearing assembly with lubricant and rotating the inner race relative to the outer race. A voltage differential is applied across the inner and the outer races and via isolated rolling elements and the race eroded an electrical discharge event across a gap defined between the one or more of the races and rolling elements. Electro-dynamically matched bearing assemblies and reaction/momentum flywheel arrangements for artificial satellites are also described.

19 Claims, 5 Drawing Sheets

(51) Int. Cl.
*F16C 19/22* (2006.01)
*F16C 33/64* (2006.01)

(56) References Cited

U.S. PATENT DOCUMENTS

| | | | | |
|---|---|---|---|---|
| 3,900,374 A | * | 8/1975 | Haggerty | B23H 3/00 204/224 M |
| 4,601,802 A | | 7/1986 | Grimes et al. | |
| 5,906,535 A | | 5/1999 | Tonooka et al. | |
| 6,176,998 B1 | * | 1/2001 | Wardle | B23H 3/00 205/652 |
| 6,461,486 B2 | | 10/2002 | Lorincz et al. | |
| 6,896,416 B2 | | 5/2005 | Matsuzaki | |
| 7,255,778 B2 | * | 8/2007 | Mori | B23H 3/00 204/212 |
| 7,374,644 B2 | | 5/2008 | Butterfield et al. | |
| 9,322,109 B2 | * | 4/2016 | Langlais | B23H 11/003 |
| 2009/0321274 A1 | * | 12/2009 | Comaty | B23H 9/00 205/649 |
| 2010/0043742 A1 | * | 2/2010 | Erdmann | B23H 3/00 123/197.3 |

FOREIGN PATENT DOCUMENTS

| | | |
|---|---|---|
| WO | 2012114847 A1 | 8/2012 |
| WO | 2015128973 A1 | 9/2015 |
| WO | 2015146689 A1 | 10/2015 |

\* cited by examiner

BEARING ASSEMBLIES WITH ELECTRODYNAMICALLY MATCHED RACES

BACKGROUND OF THE INVENTION

1. Field of the Invention

The present disclosure relates to rotating machinery, and more particularly to bearing assemblies for rotating machinery such as reaction wheels in artificial satellites.

2. Description of Related Art

Rotating machines commonly employ bearings with inner and outer raceways separated by intermediate balls or rollers to support rotary components relative to stationary components. Since mechanical loads flow through contacting surfaces of the raceways and balls or rollers during rotation the conformity ratio the of bearing, i.e., the ratio of the inner or outer raceway to the ball diameter, is selected according to the load torque and/or vibration of the application.

The machining and grinding operations used to create the raceway surfaces, raceway curvature, and spherical shape of the balls generally results in a residual amount of form error and surface roughness in the raceways and balls. Since form error and surface roughness can cause vibration, asynchronous runout, torque variation, and/or binding of the bearings, bearing systems typically includes inner raceways with curvature that is larger radius than the radius of the balls. While generally satisfactory to overcome form error and roughness in most bearing assembles, "open conformity" in some bearings can reduce the load-carrying capacity due to the associated cyclical contact stresses, which can reduce the bearing fatigue life, increase the induced vibration characteristics and torque requirement of components supported by the bearing.

Such bearings and methods of making bearings have generally been considered satisfactory for their intended purpose. However, there is still a need in the art for improved bearing assemblies and methods of making bearing assemblies. The present disclosure provides a solution for this need.

SUMMARY OF THE INVENTION

A method of electro-dynamically matching a bearing assembly includes electrically separating inner and outer races from rolling elements of the bearing assembly with lubricant and rotating the inner race relative to the outer race. A voltage differential is applied between one of the inner and the outer races and the rolling elements the race eroded an electrical discharge event across a gap defined between at least one of the races and the rolling elements.

In certain embodiments, the inner and outer elements can be mechanically matched to the rolling elements prior to electrically separating the inner and outer races. One of the inner and outer races can be fixed to a flywheel operably connected to a source of mechanical rotation. One of the inner and outer races can be fixed to a static structure. Minimum separation between the inner race and/or the outer race and the rolling elements can be reduced by the erosion.

In accordance with certain embodiments, the method can include smoothing the inner race by reducing a mechanical asperity disposed on the inner race with the electrical discharge event. The outer race can be smoothed by reducing a mechanical asperity disposed on the outer race with the electrical discharge event. The voltage differential can be applied by connecting an alternating current (AC) voltage source across the inner and/or the outer races and the rolling elements. The voltage differential can be applied by statically charging the rotating race relative to the rolling elements. The voltage differential can be removed based on a comparison of one or more of a lubricant property, load, temperature, and rotational speed with a selected value.

A bearing assembly includes an inner race arranged about an axis with a radially outer race surface, a plurality of rolling elements circumferentially distributed about the outer race surface of the inner race, and an outer race. The outer race has a radially inner race surface extending about the inner race with the rolling elements captive therebetween. One or more of the outer and inner race surfaces have an electro-dynamically eroded asperity to improve surface finish and reduce form error between the races and the rolling elements, thereby improving performance of a lubricant EHD layer defined between the race surface and the rolling elements.

In certain embodiments, a lead can be electrically connected to the inner race. A lead can be electrically connected to the outer race. A retainer can circumferentially fix a first of the rolling elements relative to a second of the rolling elements. A lead can be electrically connected to the cage. An AC source with positive and negative terminals can be connected to the bearing assembly. The AC source negative terminal can be connected to the AC source positive terminal through the rolling elements and either or both of the inner race and the outer race.

In accordance with certain embodiments, a flywheel fixed relative to the inner race or the outer race. A static structure can be connected to the other of the inner race and the outer race. A mechanical rotation source can be operably connected to the flywheel. One or more of the races and the rolling elements can include a carbide-containing metallic material. A lubricant can be disposed between the rolling elements, the inner race, and the outer race. The rolling elements can include cylindrical elements or spherical elements.

A reaction/momentum wheel arrangement for an artificial satellite includes a flywheel and a bearing assembly as described above. The rolling elements and races include a carbide-containing metallic material and a lubricant is disposed between the rolling elements and the inner and outer races. A minimum lubricant-film distance between at least one of the inner and outer races and the rolling elements is defined between an electro-dynamically eroded asperity and one of the rolling elements.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
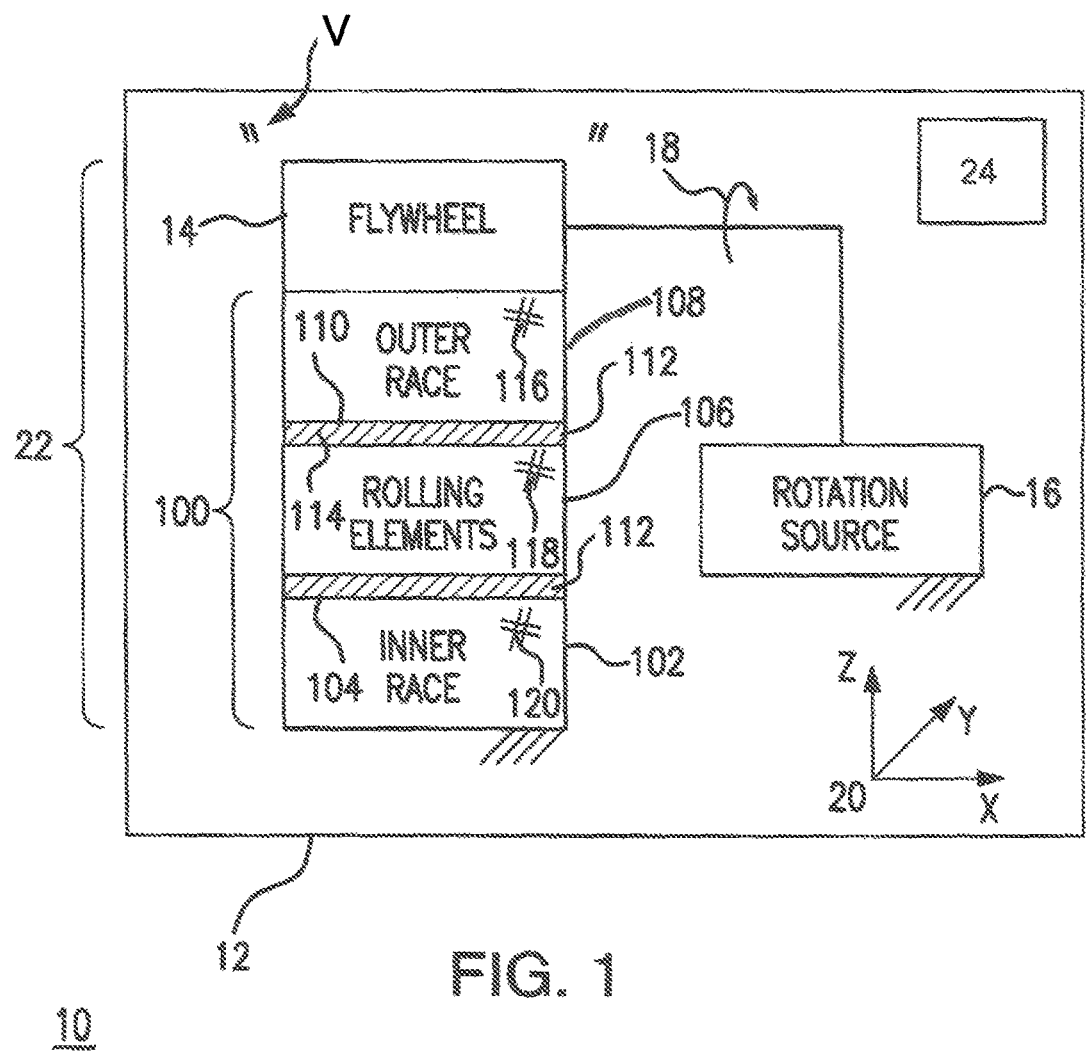
FIG. 1 is a schematic view of an exemplary embodiment of a bearing assembly constructed in accordance with the present disclosure, showing the bearing assembly supporting a flywheel in a reaction/momentum wheel arrangement in an artificial satellite.

Reference will now be made to the drawings wherein like reference numerals identify similar structural features or aspects of the subject disclosure. For purposes of explanation and illustration, and not limitation, a partial view of an exemplary embodiment of a bearing assembly in accordance with the disclosure is shown in FIG. 1 and is designated generally by reference character 100. Other embodiments of bearing assemblies, flywheels employing bearing assemblies, and methods of making bearing assemblies in accordance with the disclosure, or aspects thereof, are provided in FIGS. 2-5, as will be described. The systems and methods described herein can be used reaction/momentum wheels, such as in artificial satellites, though the present disclosure is not limited to artificial satellites or to flywheels in general.

Referring to FIG. 1, an artificial satellite 10 is shown. Artificial satellite 10 includes a static structure 12, a bearing assembly 100, a flywheel 14, and a rotation source 16. Static structure 12 is fixed relative to flywheel 14 and can include a housing or other support structure of artificial satellite 10. Rotation source 16 is operably connected to flywheel 14 for applying and controlling rotation 18 of flywheel 14 relative to static structure 12 for stabilizing rotation of artificial satellite 10 about a rotation axis 20. Flywheel 14 is supported for rotation relative to static structure 12 by bearing assembly 100 as a reaction/momentum wheel arrangement 22 for control of artificial satellite 10 about rotation axis 20, e.g., about the x-axis. Although a single flywheel 14 is shown for x-axis control, it is to be understood and appreciated that artificial satellite 10 can employ two or more flywheels arranged about multiples axes, e.g., the y-axis and/or the z-axis, to provide three-axis attitude control and stability to artificial satellite 10. Although shown as an orthogonal axis arrangement, it is to be understood and appreciated that the axes can be oblique relative to one another, as suitable for an intended application.

With continuing reference to FIG. 1, bearing assembly 100 is shown. Bearing assembly 100 includes an inner race 102 arranged about rotation axis 20 with a radially outer race surface 104, a plurality of rolling elements 106 circumferentially distributed about radially outer race surface 104 of inner race 102, and an outer race 108. Outer race 108 has a radially inner race surface 110 that extends about inner race 102. Rolling elements 106 are captive between radially outer race surface 104 of inner race 102 and radially inner race surface 110 of outer race 108.

As will be appreciated by those of skill in the art in view of the present disclosure, lubricant disposed between race surfaces 102/104 and rolling elements 106 forms an elasto-hydrodynamic (EHD) layer 112 between the race surfaces 102/104 and rolling elements 106. Either or both of outer race radially inner race surface 110 and inner race radially outer race surface 104 have an electro-dynamically eroded asperity 164 (shown in FIG. 3C). Since performance of the lubricant EHD layer 112 is a function of rotational speed and form of bearing assembly 100, reducing form error within bearing assembly 100 by smoothing opposing surfaces between race surfaces 102/104 and rolling elements 102 improves the least-hydrodynamic liftoff speed of bearing assembly 100, which is driven by a ratio of film thickness and surface finish, i.e., the lambda ratio of bearing assembly 100. Improving the least-hydrodynamic liftoff speed of bearing assembly reduces vibration in bearing assembly 100 during vibration, which in turn can improve vibration-sensitive devices coupled to bearing assembly 100, such as imaging device 24.

Lubricant EHD layer 112 is occupied at least in part by a lubricant 114. A portion of lubricant 114 is disposed between rolling elements 106 and outer race 108, i.e., between rolling elements 106 and radially outer race surface 110. A portion of lubricant 114 is also disposed between rolling elements 106 and inner race 102, i.e., between rolling elements 106 and radially inner race surface 104. Examples of lubricant 114 include SHF X2000, sold under the tradename Pennzane®, available from Nye Lubricants of New Bedford, Mass., which has a dielectric constant suitable for controlled erosion of race surfaces at relative low voltages for improving surface finish and/or reducing form error in mechanically matched bearing assemblies.

In the illustrated exemplary embodiment outer race 108 includes a metallic material 116, rolling elements include a metallic material 118, and inner race 102 includes a metallic material 120. It is contemplated that one or more of metallic material 116, metallic material 118, and metallic material 120 include a carbide-containing metallic material. In accordance with certain embodiments, metallic material 120 has a metallic alloy composition that is substantially the same as metallic alloy composition of metallic material 116 and metallic material 118. Metallic material 118 can include, but not limited to, martensitic stainless steel materials like AISI 440C and austenitic stainless steel materials like AISI 316, AISI303, and AISI304 used in conjunction with SAE 52100 chrome steel roller elements.

Flywheel 14 is fixed relative to inner race 102 or outer race 108. In the illustrated exemplary embodiment flywheel 14 is fixed relative to outer race 108, inner race 102 is fixed relative to static structure 12, and rotation source 16 is connected to flywheel 14. As will be appreciated by those of skill in the art in view of the present disclosure, flywheel 14 can be fixed to inner race 102 and outer race 108 fixed relative to static structure 12, as suitable for an intended application.

As shown in FIG. 1, flywheel 14 and bearing assembly 100 are supported within artificial satellite 10 in a reaction/momentum wheel arrangement 22 with lubricant 114 disposed between rolling elements 106 and inner race 102 and outer race 108. Form error in opposing surfaces bounding lubricant EHD layer 112 is defined between an electrodynamically eroded asperity 164 (shown in FIG. 3B) of one of inner race 102 and outer race 108 and one of rolling elements 106. As will also be appreciated by those of skill in the art in view of the present disclosure, vibration V associated with rotation of flywheel 14 about rotation axis 20 couples to static structure 12 through bearing assembly 100 and can influence performance of devices carried by artificial satellite 10, such as an exemplary imaging device 24. Reducing form error in either (or both) inner race 102 and outer race 108 lubricant EHD layer 112 between an electro-dynamically eroded asperity 164 of one of inner race 102 and outer race 108 and one of rolling elements 106 reduces magnitude of vibration V, improving performance of imaging device 24.

Figure 2:
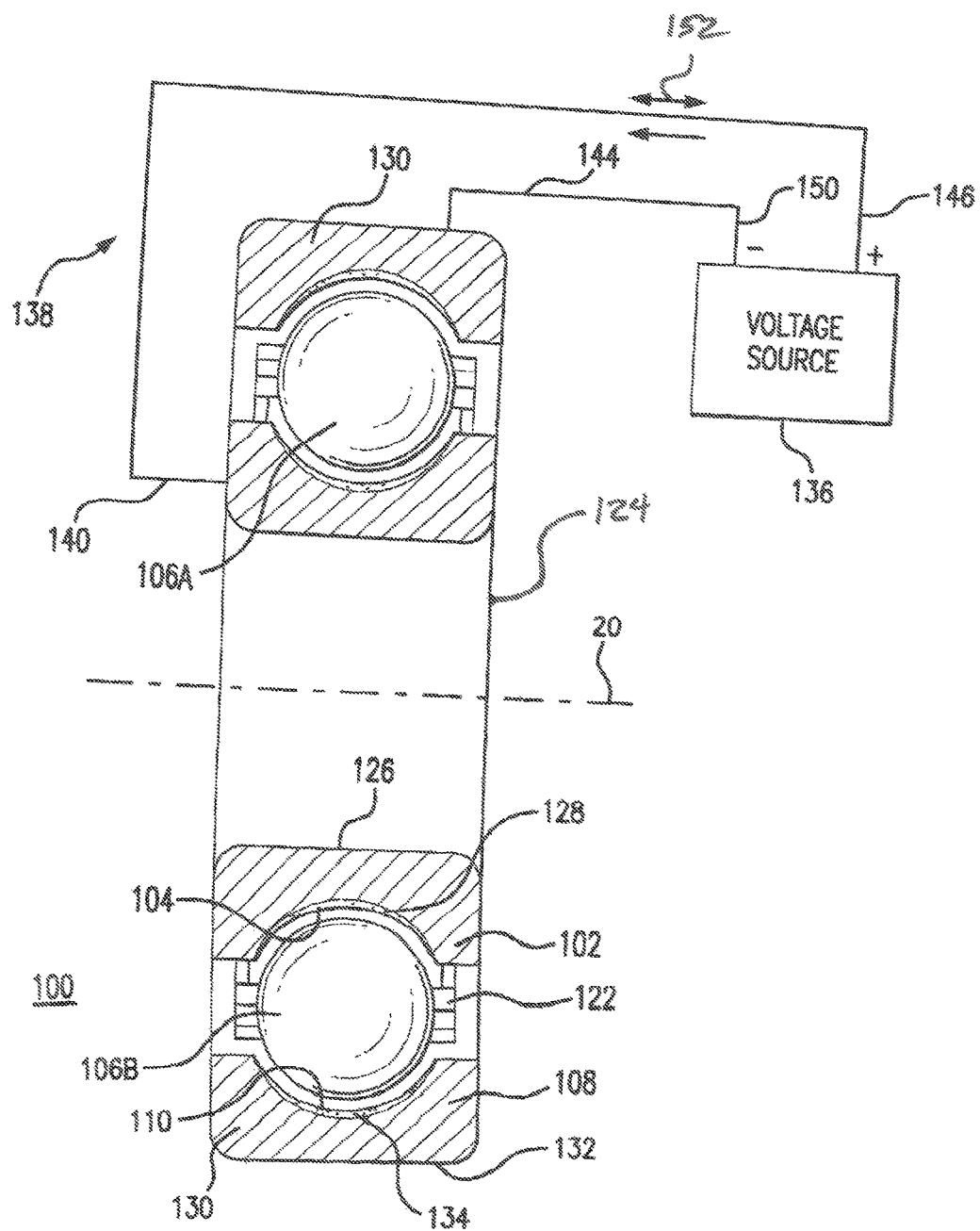
FIG. 2 is a cross-sectional side view of the bearing assembly of FIG. 1, showing a voltage source connected to the bearing assembly for eroding asperities on the bearing race surfaces using electrical discharge events between the ball rolling elements and bearing races.

With reference to FIG. 2, bearing assembly 100 is shown. Bearing assembly 100 includes inner race 102, first and second rolling elements 106A and 106B, a rolling element retainer 122, and outer race 108. Inner race 102 extends about rotation axis 20. Outer race 108 extends about inner race 102 and rotation axis 20. Rolling elements 106 circumferentially spaced about inner race 102 and rotation axis 20 and arranged radially between inner race 102 and outer race 108. Retainer 122 is arranged between inner race 102 and outer race 108 and retains rolling elements 106 at selected circumferential pitch about rotation axis 20. In this respect retainer 122 circumferentially fixes a first spherical rolling element 106A relative a second spherical rolling element 106B about inner race 102.

Inner race 102 has an annular body 124 with a radially inner surface 126 and radially outer race surface 104. Annular body 124 extends about rotation axis 20. Radially inner surface 126 is arranged for fixation to static structure 12 (shown in FIG. 1). Radially outer race surface 104 has an electrodynamic surface portion 128 which matches surfaces of rolling elements 106 subsequent to mechanically matching inner race 102 to rolling elements 106. In the illustrated exemplary embodiment surface portion 128 is disposed only a radially outer race surface facing rolling elements 106. It is contemplated that, in certain embodiments, smoothness of radially inner surface 126 remains substantially unchanged by the process used to form surface portion 128.

Outer race 108 has an annular body 130 with a radially outer surface 132 and radially inner race surface 110. Annular body 130 extends about inner race 102 and rotation axis 20. Radially outer surface 132 is arranged for fixation to flywheel 14 (shown in FIG. 1) and for common rotation with flywheel 14 about rotation axis 20. Radially inner race surface 110 has an electrodynamic matched surface portion 134 which matches surfaces of rolling elements 106. In the illustrated exemplary embodiment surface portion 134 is disposed only a radially outer race surface facing rolling elements 106. It is contemplated that, in certain embodiments, smoothness of radially outer surface 132 remains substantially unchanged by the process used to form surface portion 134.

Also shown in FIG. 2 is voltage source 136 for forming electrodynamically matched surface portion 128 on inner race 102 and electrodynamically matched surface portion 134 on outer race 108. Voltage source 136 is connected to bearing assembly through a matching circuit 138. In the illustrated exemplary embodiment matching circuit 138 includes an inner race lead 140 and an outer race lead 144. Inner race lead 140 connects a terminal of voltage source 136, e.g., a positive terminal 146, to inner race 102 for applying a voltage differential across inner race 102 and rolling elements 106. Outer race lead 144 similarly connects a terminal of voltage source 136, e.g., negative terminal 150, to outer race 130 for applying a voltage differential across outer race 130 and inner race 126.

Once matching circuit 138 is established one of inner race 102 and outer race 108 is rotated relative to the other of inner race 102 and outer race 108, e.g., via rotation 18 (shown in FIG. 1) provided by rotation source 16 (shown in FIG. 1). While undergoing rotation, a potential difference is applied between outer race 108 and inner race 102. The potential difference (illustrated schematically with positive and negative signs at voltage source 136) can be applied, for example, using an AC voltage 152.

As a selected amount of rotational energy is applied electrical discharge events occur spontaneously at bearing surface asperities via rolling elements 106 according to the race surface topography, eroding race surface asperities, and thereby matching the respective bearing surface(s) to the rolling elements and develop surface portion 128 and/or surface portion 134. Although illustrated in FIG. 2 as being directly connected to power source negative terminal 150, those of skill in the art will appreciate in view of the present disclosure that inner race 102 can be connected to a ground terminal, such as a chassis ground terminal of artificial satellite 10 (shown in FIG. 1).

In certain embodiments, the voltage differential can be applied statically. In this respect it is contemplated that the electrical isolation of either inner race 102 and/or outer race 108 be interrupted and the rotating one of inner race 102 and outer race 108 permitted to develop a static charge, such as from windage of lubricant 114 (shown in FIG. 1) frictionally moving across the respective bearing surface. As a selected amount of rotational energy is applied static electrical discharge events occur spontaneously at bearing surface asperities via rolling elements 106 according to the race surface topography, eroding race surface asperities, and thereby matching the respective bearing surface(s) to the rolling elements and develop surface portion 128 and/or surface portion 134.

Figure 3A:
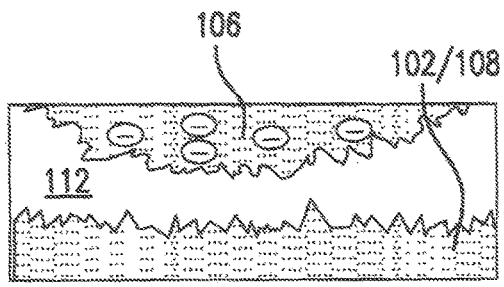
FIGS. 3A-3H are schematic cross-sectional views of ball and races surfaces separated by a lubricant elasto-hydrodynamic layer of the bearing assembly of FIG. 1 being matched to a rolling element electrodynamically, showing asperities of the bearing race being eroded by electric discharge events to improve performance the lubricant elasto-hydrodynamic layer between the bearing race surfaces and the rolling element.
Figure 3B:
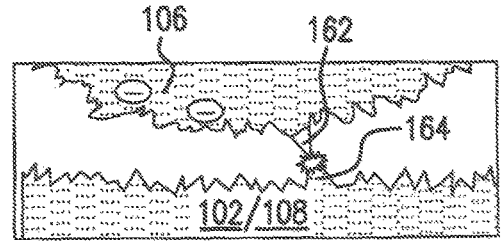
Figure 3C:
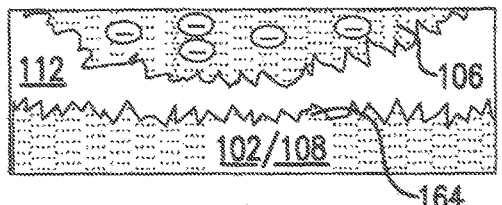

With reference to FIGS. 3A-3H, formation of a race surface, e.g., radially outer race surface 104 of inner race 102 and/or radially inner race surface 110 of outer race 108, is shown. As shown in FIG. 3A, at the beginning of the matching (or electrodynamic run-in process) inner race 102 and outer race 108 is rotated relative to rolling elements 106. An electrical charge develops on the inner race or outer race 108, causing a potential difference to develop across lubricant EHD layer 112. When the potential difference exceeds the dielectric breakdown strength of lubricant forming EHD layer 112 an electrical discharge event 162 occurs between an asperity 164 bounding EHD layer 112, as shown in FIG. 3B. Electrical discharge event 162 removes material from asperity 164, reducing height of asperity 164 through erosion. Removal of material from asperity 164 improves bearing surface error and reduces form error between races 102/104 and rolling elements 106, as shown in FIG. 3C. Removal of material from asperity 164 also increases the breakdown voltage of lubricant disposed between races 102/104 and rolling elements 106.

Figure 3D:
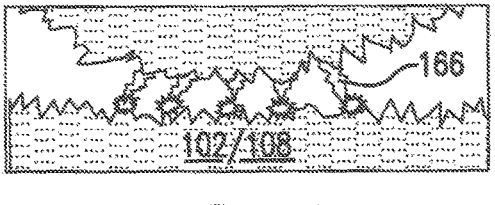
Figure 3E:
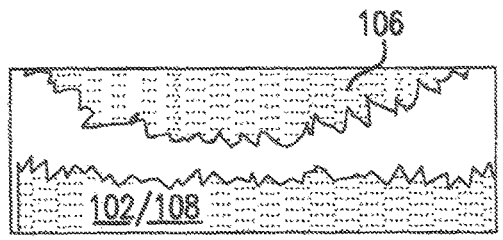
Figure 3F:
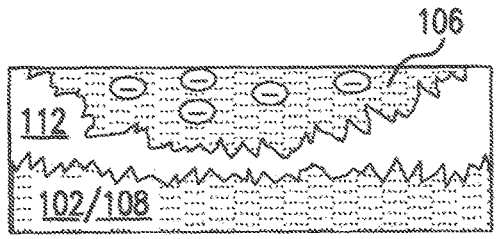
Figure 3G:
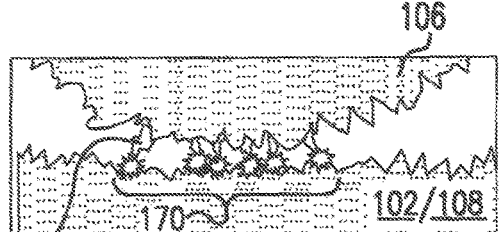
Figure 3H:
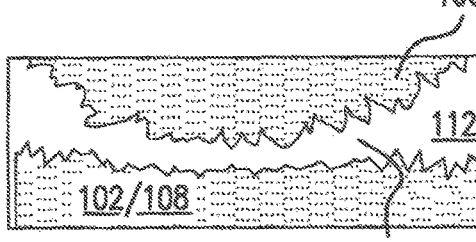

As shown in FIG. 3D, as the dominant asperities are eroded the matching process becomes dominated by electrostatic discharge events 166. Electrostatic discharged events 166 are more frequency and of lower voltage, as shown in FIG. 3D due to localized changes in the dielectric breakdown voltage of lubricant EHD layer 112 associated with erosion of asperity 164. This results in further smoothing of the bearing surface, as shown in FIG. 3E and improving surface finish and reduction form error between races 102/104 and rolling elements 106, discharge events eroding asperities bounding lubricant EHD layer 112 to a sweet spot corresponding to a nearly perfect 0.5 conformity ratio, as shown in FIG. 3F, e.g., where a selected input torque results in achievement of the minimum achievable EHD operation rotational speed. As shown in FIGS. 3G and 3F, matching can continue until a selected discharge voltage target 168, discharge frequency 170 and/or lubricant temperature target 172 is reached corresponding to a desired amount of conformity in bearing assembly 100. As shown in FIG. 3H, finishing can continue until such point where the surface of the inner and/or outer race matches rolling elements 106, mechanically matched and electrodynamically matched being on opposite ends of a continuum increasing conformity, electrodynamically finished surfaces having better conformity than mechanically matched surfaces, and electrodynamically matched surfaces having better conformity than electrodynamically finished surfaces.

Figure 5:
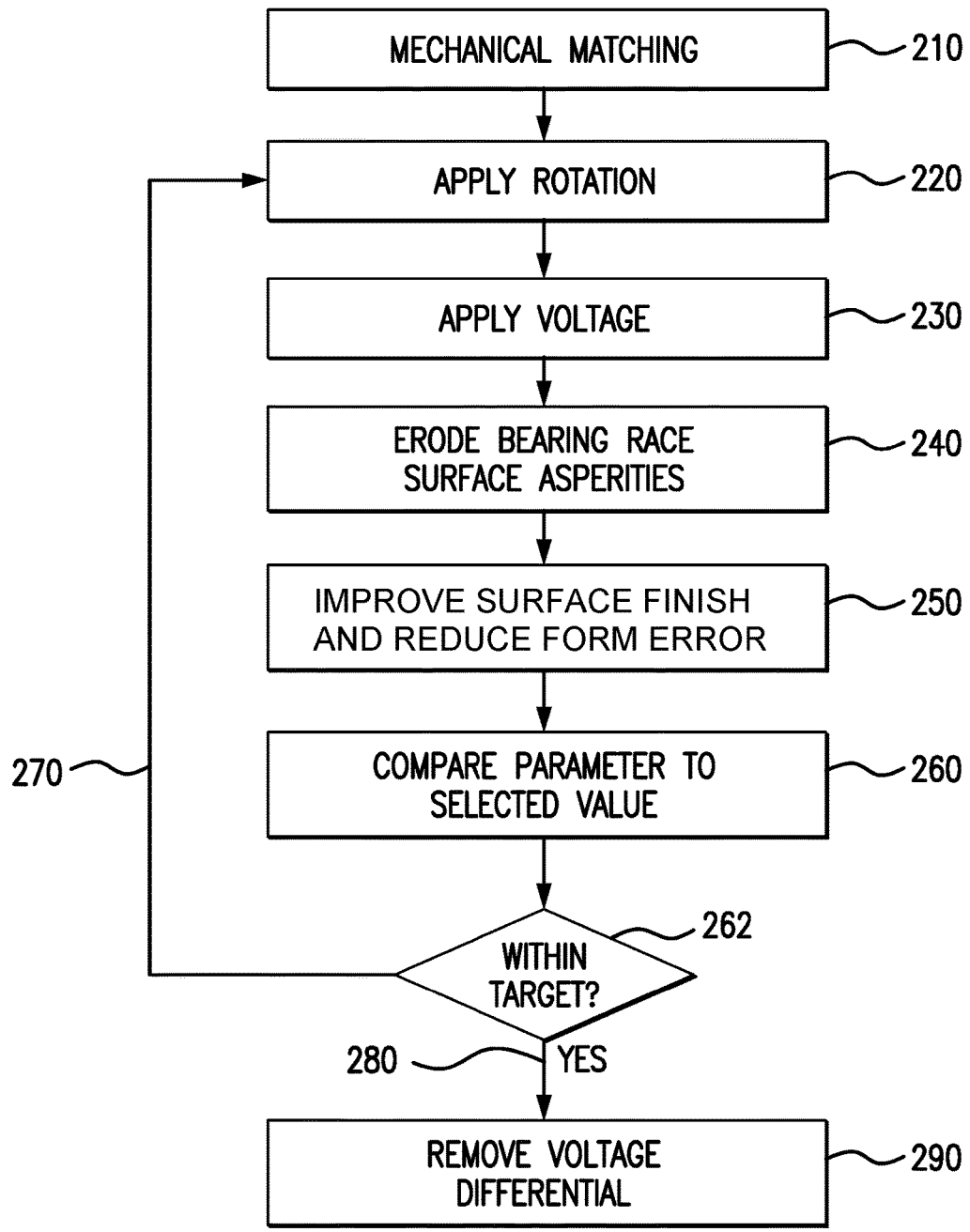
FIG. 5 is process flow diagram of a method of matching a bearing race to a rolling element according to the present disclosure, showing the steps of the method.

Referring now to FIG. 5, a method 200 of electrodynamically matching a bearing assembly, e.g., bearing assembly 100, is shown. Method 200 includes mechanically matching and assembling inner and outer races, e.g., inner race 102 (shown in FIG. 1) and outer race 108 (shown in FIG. 1), with rolling element, e.g., rolling elements 106 (shown in FIG. 1), as shown with box 210. One of the inner and outer races can be fixed to a flywheel, e.g., flywheel 14 (shown in FIG. 1), operably connected to a source of mechanical rotation, e.g., rotation source 16 (shown in FIG. 1). One of the inner and outer races can be fixed to a static structure, e.g., static structure 12 (shown in FIG. 1). Lubricant, e.g., lubricant 114, is interposed between the rolling elements a radially outer race surface, radially outer race surface 104 (shown in FIG. 1), and a radially inner race surface, e.g., radially inner race surface 110 (shown in FIG. 1). Examples of bearing assemblies suitable for electrodynamic matching according to method 200 include ball and roller bearing assemblies available from The Barden Corporation of Danbury, Conn.

One of the inner race and outer race is rotated relative to the other of the inner and outer races by applying mechanical rotation to the bearing assembly, as shown with box 220. A voltage differential is applied across the bearing assembly, as shown with box 230, and electrical discharge events provoked between the race and the rolling elements. The electrical discharge events erode asperities disposed on the race surfaces, e.g., asperity 164 (shown in FIG. 3B), as shown with box 240. Erosion of asperity 164 improves surface finish and reduces form error between races 102/104 and rolling elements 106, improving lubricant 112 (shown in FIG. 1) performance, as shown with box 250.

As the voltage differential is applied to the bearing assembly one or more parameter is compared to a selected parameter value, as shown with box 260. Examples of parameters include magnitude of electric discharge events, frequency of electrical discharge event, rotational speed realized with an input torque to the bearing assembly, and/or lubricant temperature. When the comparison indicates that the selected parameter has not been reached application of the voltage continues, as shown with decision box 262 and arrow 270. When the comparison indicates that the selected parameter has been reached the voltage is removed, as shown with arrow 280 and box 290.

Figure 4:
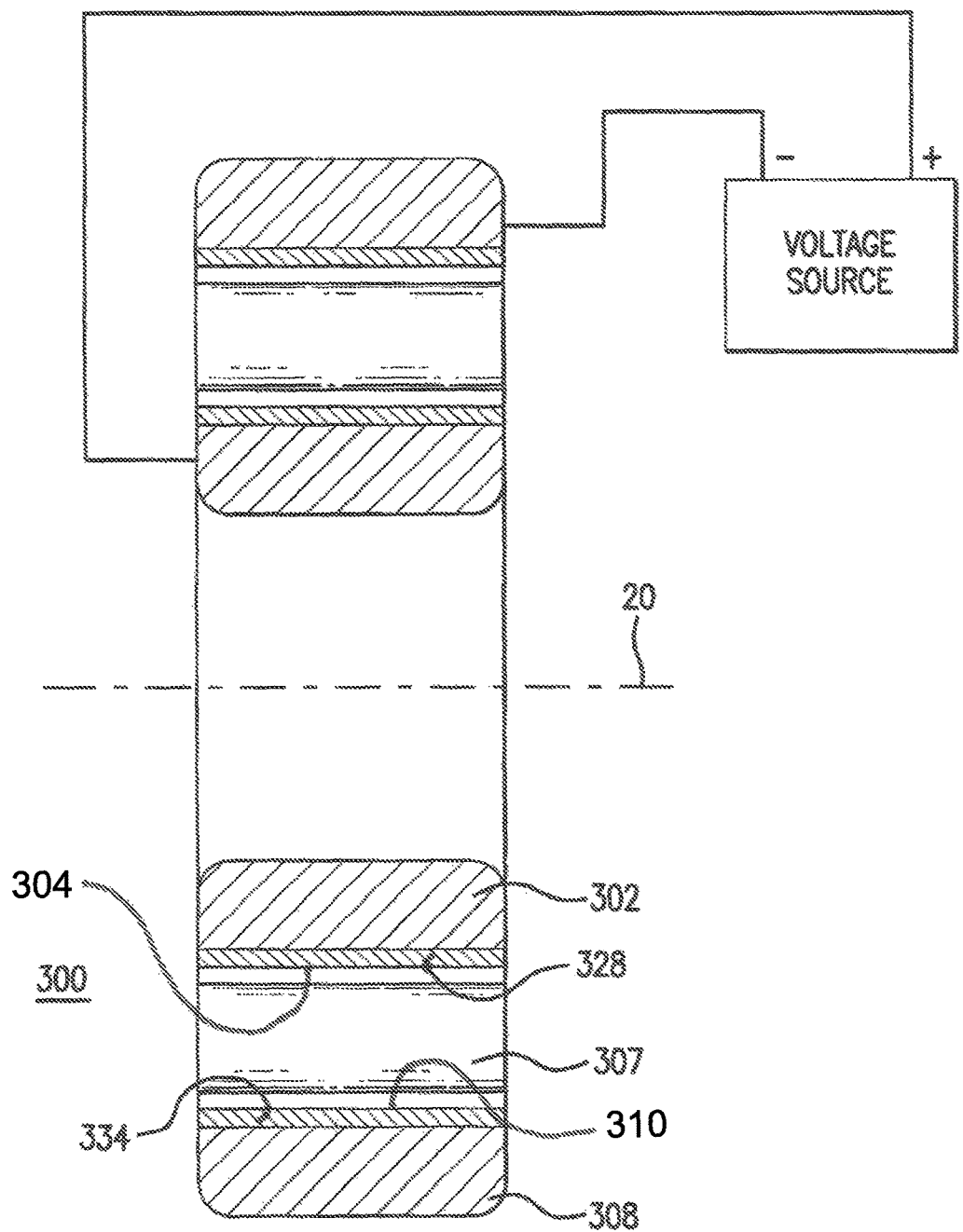
FIG. 4 is a is a cross-sectional side view of the bearing assembly of FIG. 1 according to a second embodiment, showing a voltage source connected to the outer and inner races for eroding asperities on the races surfaces using electrical discharge events between cylindrical rolling elements and the bearing races.

With reference to FIG. 4, a bearing assembly 300 is shown. Bearing assembly 300 is similar to bearing assembly 100 (shown in FIG. 1) and additionally includes cylindrical rolling elements 307. An inner race 302 and an outer race 308 are electrodynamically matched to cylindrical rolling elements 307, inner race 302 having a radially outer race surface 304 with an electrodynamically matched surface portion 328 and outer race 308 having a radially inner race surface 310 with an electrodynamically matched surface portion 334.

Some bearings in rotating machinery can exhibit electrical discharge erosion. Electrical discharge erosion is an uncontrolled phenomenon wherein voltage differential builds up and dissipates across rotating and stationary bearing elements. The electrical discharge events can influence the reliability of the rotating machine by causing pitting, cratering, and/or erosion of the bearing element surfaces. For this reason bearing assemblies in rotating machines are typically electrical isolated or grounded to prevent the accumulation of an electrical potential across the bearing surfaces of the bearings.

In embodiments described herein the potentially destructive effect of electrical discharge is applied to assembled bearing assemblies to more closely match the bearing assembly races to the rolling elements. In certain embodiments a static charge is controllably developed by rotating one of the races relative to the other to provoke electric discharge events between the race surfaces and the rolling elements. The permitted accumulation of static charge provokes electric discharge events erode asperities on the bearing surfaces, improving race surface finish and form error between races and rolling elements bounding the lubricant EHD layer between the bearing surfaces and the rolling elements. In accordance with certain embodiments, a potential difference is applied to the bearing assembly to controllably generate a potential difference between the race surfaces and the rolling elements. The applied voltage differential provokes electric discharge events erode asperities on the bearing surfaces, improving race surface finish and reducing form error in races and rolling elements bounding the lubricant EHD layer between the bearing surfaces and the rolling elements.

Without being limited to a particular mechanism, it is believed that application of relative low voltages to bearing assemblies can constructively smooth race surfaces of the bearing assembly. In particular, application of relatively low voltages to bearing assemblies can gently erode the bearing race surface in a way that is compensatory in relation to the rolling elements of the bearing assembly subsequent to assembly to more closely conform the race to the rolling element by reducing race form error.

It is believed that the mechanism is compensatory because erosion is influenced by the amount of stress carried by a given location as well as the instantaneous EHD layer performance within the bearing assembly. The smoothing takes places progressively as the low voltage induces electric discharge events at the highest asperities on the race surface, the discharge heat vaporizing the peak of the asperity participating in the electric discharge event. Advantageously, the electric discharge events remove carbide asperities via the same mechanism (and rate) as steel asperities notwithstanding the differing hardness of the materials, thereby smoothing carbide-containing steel race surfaces without leaving the surface artifacts that can remain from honing, such as with stone honing techniques. Matching can be accomplished by controlling one or more of lubricant properties, load, temperature, and/or rotational speed during the initial run-in of a bearing assembly. Voltage can be applied using a motor magnetic field, static charge accumulation form windage, or from a voltage source with controlled voltage amplitude and frequency.

The methods and systems of the present disclosure, as described above and shown in the drawings, provide for bearing assemblies with superior properties including improved race surface matching. Bearing assemblies electrodynamically matched with the methods described herein can have lower disturbances, higher capacity, higher fatigue life, and/or smooth surface of lower EHD liftoff speeds to reduce metal-to-metal wear during low-speed operation as compared to similar bearing assemblies run-in using different run-in techniques. While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. A method of electro-dynamically matching a bearing assembly, comprising:
   electrically separating inner and outer races from rolling elements with lubricant;
   rotating the inner race relative to the outer race;
   applying a voltage differential across the inner race and the outer race; and
   eroding at least one of the inner race and the outer race with an electrical discharge event across a lubricant disposed between the one inner race or the outer race and a rolling element.

2. The method as recited in claim 1, further comprising mechanically matching the inner and outer races to the rolling elements prior to electrically separating the inner and outer races.

3. The method as recited in claim 1, further comprising seating one of the inner race and the outer race in a flywheel operably connected to a source of mechanical rotation.

4. The method as recited in claim 3, further comprising seating the other of the inner race and the outer race a shaft that is static relative to the flywheel.

5. The method as recited in claim 1, further comprising reducing a minimum speed to achieve elasto-hydrodynamic operation between the inner race and the rolling elements.

6. The method as recited in claim 1, further comprising reducing a minimum speed to achieve elasto-hydrodynamic operation between the outer race and the rolling elements.

7. The method as recited in claim 1, further comprising smoothing the inner race by reducing one or more mechanical asperity disposed on the inner race with an uncontrolled electrical discharge event.

8. The method as recited in claim 1, further comprising smoothing the outer race by reducing a mechanical asperity disposed on the outer race with an uncontrolled electrical discharge event.

9. The method as recited in claim 1, wherein applying the voltage differential includes applying an alternating current voltage differential across the inner race and the outer race.

10. The method as recited in claim 1, further comprising removing the voltage potential by comparison of one or more of a lubricant property, load, temperature, and rotational speed with a selected value.

11. A bearing assembly, comprising:
   an inner race arranged about an axis with a radially outer race surface;
   a plurality of rolling elements circumferentially distributed about the outer race surface of the inner race;
   an outer race with a radially inner race surface extending about the inner race with the rolling elements captive therebetween,
   wherein at least one of the outer race surface and the inner race surface has an electro-dynamically eroded asperity bounding a lubricant EHD layer defined between the race surface and the rolling elements; and
   an alternating current (AC) source with a positive and a negative terminal, wherein the positive terminal is electrically connected to the negative terminal through the inner race and the outer race.

12. The bearing assembly as recited in claim 11, further comprising a lead electrically connected to the inner race.

13. The bearing assembly as recited in claim 11, further comprising a lead electrically connected to the outer race.

14. The bearing assembly as recited in claim 11, further comprising a flywheel fixed relative to one of the inner race and the outer race and a static structure connected to the other of the inner race and the outer race.

15. The bearing assembly as recited in claim 14, further comprising a mechanical rotation source operably connected to the flywheel.

16. The bearing assembly as recited in claim 11, wherein at least one of the inner race, the outer race, and the rolling elements comprises a carbide-containing metallic material.

17. The bearing assembly as recited in claim 11, further comprising a lubricant disposed between the rolling elements, the inner race, and the outer race.

18. A reaction/momentum wheel arrangement for an artificial satellite, comprising:
   a flywheel; and
   a bearing assembly comprising:
      an inner race arranged about an axis with a radially outer race surface;
      a plurality of rolling elements circumferentially distributed about the outer race surface of the inner race; and
      an outer race with a radially inner race surface extending about the inner race with the rolling elements captive therebetween,
      wherein at least one of the outer race surface and the inner race surface has an electro-dynamically eroded asperity bounding a lubricant EHD layer defined between the race surface and the rolling elements; and
   a lubricant disposed between the rolling elements and the inner and outer races, wherein the rolling elements and inner and outer races include a carbide-containing metallic material,
   wherein a minimum lubricant-film distance between at least one of the inner and outer races and the rolling elements is defined between an electro-dynamically eroded asperity and one of the rolling elements.

19. An artificial satellite, comprising:
   a reaction/momentum wheel as recited in claim 18;
   where the flywheel is fixed relative to one of the inner race and the outer race and a static structure connected to the other of the inner race and the outer race; and
   a mechanical rotation source operably connected to the flywheel.

* * * * *